United States Patent [19]

Walker

[11] Patent Number: 4,605,694

[45] Date of Patent: Aug. 12, 1986

[54] PLASTICIZING COMPOSITIONS FOR POLYVINYLCHLORIDE

[75] Inventor: John F. Walker, Wilmington, Del.

[73] Assignee: Hercules Incorporated, Wilmington, Del.

[21] Appl. No.: 793,508

[22] Filed: Oct. 31, 1985

[51] Int. Cl.[4] ............................................. C08K 5/12
[52] U.S. Cl. ................................................ 524/292
[58] Field of Search ....................................... 524/292

[56] References Cited

U.S. PATENT DOCUMENTS

| | | | |
|---|---|---|---|
| 2,862,961 | 12/1958 | Goreau | 260/488 |
| 3,135,785 | 6/1964 | Fritz | 260/485 |
| 3,936,403 | 2/1976 | Sakaguchi et al. | 524/317 |
| 3,947,369 | 3/1976 | Leibfried | 252/57 |
| 4,332,702 | 6/1982 | Lindner | 524/310 |
| 4,356,110 | 10/1982 | Sallmen et al. | 524/343 |
| 4,390,585 | 6/1983 | Holden | 427/277 |
| 4,421,886 | 12/1983 | Worschech et al. | 524/317 |
| 4,447,569 | 5/1984 | Brecker et al. | 524/109 |
| 4,501,840 | 2/1985 | Werle et al. | 524/377 |

Primary Examiner—Joseph L. Schofer
Assistant Examiner—N. Sarofim
Attorney, Agent, or Firm—William E. Player

[57] ABSTRACT

Disclosed are plasticized compositions comprising polyvinylchloride, a trimellitate ester, and a pentaerythritol alkanoic acid ester.

5 Claims, No Drawings

PLASTICIZING COMPOSITIONS FOR POLYVINYLCHLORIDE

BACKGROUND OF THE INVENTION

This invention relates to compositions that are useful as plasticizers for polyvinylchloride (commonly referred to as PVC). More particularly, it relates to plasticizers for PVC intended for use in high temperature resistant applications.

Trimellitate esters, such as tri(2-ethylhexyl)trimellitate, are known plasticizers for PVC for many uses where plasticizing efficiency, permanence, and physical property retention are important, such as high temperature resistant wire and cable jacketing and insulation, as well as other high temperature applications.

Extenders (often called secondary plasticizers), normally incompatible with PVC, are often used in combination with certain plasticizers for PVC to reduce costs, extend plasticizers in short supply. The extendability of a given plasticizer depends upon its ability to compatibilize compounds that would be useful as secondary plasticizers for PVC.

The values for the solubility parameter and the dielectric constant of a plasticizer are theorized to be good indicators of the compatibility of the plasticizer with PVC and also are indicators of whether or not a plasticizer can be extended with a secondary plasticizer, which usually is only marginally compatible with PVC. Stated in other words, the values indicate the ability of a plasticizer to compatibilize an extender or secondary plasticizer. In general, the closer the value of the solubility parameter is to 9.9, and the closer the dielectric constant is to between 6 and 7, the better will that plasticizer be in compatibilizing secondary plasticizers or extenders (see J. K. Sears and J. R. Darby, "The Technology of Plasticizers", John Wiley and Sons, Inc., 1982, pp 484–486).

To be practically useful for high temperature resistant PVC applications, an extender for trimellitate esters, such as for example, tri(2-ethylhexyl)trimellitate, must have sufficient plasticizing efficiency (i.e., impart good physical properties) and high temperature permanence (i.e., maintain good physical properties under high temperature stress) as well as be compatibilized by the trimellitate ester. However, based on the above theory, since tri(2-ethylhexyl)trimellitate has a solubility parameter (9.0) indicating only marginal compatibilizing power and a dielectric constant (4.7) indicating poor compatibilizing power, an extender that would be practically useful for trimellitate esters, such as tri(2-ethylhexyl)trimellitate, used to plasticize PVC intended for use in high temperature resistant applications would be unexpected, and until now, was unknown.

SUMMARY OF THE INVENTION

According to the invention, PVC blended with a plasticizing composition is characterized in that the plasticizing composition comprises:

(a) at least one trimellitate ester having the structural formula

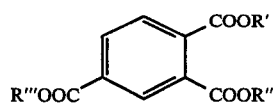

wherein R', R", and R''' are independently branched or straight chain alkyls having about 6 to about 10 carbon atoms; and (b) at least one pentaerythritol alkanoic acid ester, wherein the alkanoic acid is n-heptanoic acid or a mixture of straight chain $C_5$–$C_{10}$ monocarboxylic alkanoic acids having an average carbon chain length of 6.5 to 7.5 and having less than about 15% by weight $C_5$ and $C_{10}$ monocarboxylic alkanoic acids.

Theoretical expectations not withstanding, the pentaerythritol alkanoic acid ester extender is compatabilized by the trimellitate ester plasticizer, and the extender has sufficient plasticizing efficiency and high thermal stability to be used as a secondary plasticizer in high temperature resistant PVC applications.

DESCRIPTION OF THE INVENTION

The pentaerythritol alkanoic acid esters useful in accordance with this invention are made by completely esterifying pentaerythritol, using methods well known to those skilled in the art, with n-heptanoic acid or a mixture of straight chain $C_5$–$C_{10}$ monocarboxylic alkanoic acids having an average chain length of $C_{6.5}$–$C_{7.5}$ and having less than 15% by weight $C_5$ and $C_{10}$ straight chain monocarboxylic alkanoic acids. n-Heptanoic acid is preferred.

Pentaerythritol used in accordance with this invention is monopentaerythritol or a mixture of at least 80% by weight monopentaerythritol and one or more polypentaerythritols, such as for example, technical pentaerythritol, which is a mixture of monopentaerythritol and 12% by weight polypentaerythritols, mostly dipentaerythritol.

The average carbon chain length of a mixture of the alkanoic acids is determined by multiplying the weight percent of each acid in the mixture by its carbon chain length, and then adding the resulting products; for example, a mixture of 30% hexanoic acid ($C_6$) and 70% octanoic acid ($C_8$) has an average carbon chain length: $(0.3 \times 6) + (0.7 \times 8) = 7.4$.

The trimellitate ester useful in accordance with this invention has the structural formula described hereinabove. Typical trimellitate esters are, for example, tri(2-ethylhexyl)trimellitate, triisononyl trimellitate, and triisooctyl trimellitate.

The trimellitate esters are made by methods known in the art, for example, as disclosed in U.S. Pat. No. 3,947,369 issued to R. Liebfried, the disclosure of which is incorporated by reference.

The trimellitate ester plasticizer and pentaerythritol ester extender are combined to make the plasticizing composition by known methods that will be apparent to those skilled in the art. The amount of the extender used varies depending on the specific application. Generally, the extender comprises less than about 50%, preferably less than about 30%, of the weight of the plasticizing composition. Specific amounts of extender usable in a specific application is determined by methods that will be apparent to those skilled in the art.

Plasticizing PVC in accordance with this invention is by known methods that will be apparent to those skilled in the art, such as disclosed in the examples herein.

Based on the weight of PVC used, the amount of plasticizing composition used varies between about 40% and about 60%, with specific amounts being determined according to the specific PVC application by known methods that will be apparent to those skilled in the art. Preferably, stabilizers such as for example, lead phthalate, are also added during plasticizing to prevent oxidation during processing and later use. Other useful additives are known and include, for example, pigments, fillers, and lubricants (i.e. processing aids), which uses depend on the specific PVC application and will be apparent to those skilled in the art.

In a particular embodiment of this invention, the plasticizing compositions are blended with PVC intended for use as jacketing or insulation for wire and cable, especially high temperature resistant jacketing or insulation. PVC plasticized according to this invention surpasses standards set forth in Underwriters Laboratories 62 (12th ed., 1981) for 105° C. wire and cable. Examples of wire and cable suitable in this embodiment are coaxial cable, communications wire and cable, fiber optic cable, building wire, aircraft wire and cable, fixture wire, control wire and cable, automotive wire and cable, electronics wire and cable, flat/ribbon cable, and marine wire and cable. Especially suitable are any of these applications requiring high temperature resistant insulation or jacketing.

Material comprising PVC plasticized according to this invention is made into wire and cable insulation and jacketing by known methods, which will be apparent to those skilled in the art, such as for example, compression, injection, or extrusion molding.

These and other known jacketed and/or insulated wires and cables are made according to known methods, with known materials, such as for example, conductors, shielding, armoring, taping, etc., which will be apparent to those skilled in the art.

The following examples are included to further illustrate this invention. However, the instant invention is not intended to be limited thereto. All parts and percentages are by weight unless otherwise indicated.

EXAMPLES 1 and 2

A standard formulation for testing plasticizers for utility in high performance PVC cable and wire covering is used to test the plasticizing compositions of this invention.

The following ingredients are dry blended in a Waring Blender:

| | |
|---|---|
| Polyvinylchloride homopolymer | 100 parts |
| Inherent Viscosity Typically: 1.02 | |
| Specific Gravity Typically: 1.4 | |
| Minimum Volume Resistivity (ASTM D275-66): | |
| $2 \times 10^{12}$ ohm/cm at 95° C. | |
| Apparent Density: .5 gm/cc | |
| Modified Dibasic Lead Phthalate Stabilizer | 10 parts |
| Specific Gravity: 3.4 | |
| % Lead: 71.1 | |
| Clay filler (calcined kaolin) | 10 parts |
| Dibasic Lead Stearate Lubricant | 0.5 parts |

Five samples are made—two examples of this invention and three controls—by dry blending the following compositions and the above formulation with a spatula:

| | Composition | Parts/100 Parts PVC |
|---|---|---|
| Example 1 | tri(2-ethylhexyl)trimellitate (extended with) | 25 parts |
| | technical penaterythritol heptanoate | 25 parts |
| Example 2 | tri(2-ethylhexyl)trimellitate (extended with) | 35 parts |
| | technical pentaerythritol heptanoate | 15 parts |
| Control 1 | tri(2-ethylhexyl)trimellitate | 50 parts |
| Control 2 | di-isodecyl-phthalate | 50 parts |
| Control 3 | di-isodecyl-phthalate (extended with) | 25 parts |
| | technical pentaerythritol heptanoate | 25 parts |

To make the technical pentaerythritol heptanoate, a chamber equipped with agitator, thermometer, $N_2$ purge and moisture trap is charged with 354 parts technical pentaerythritol and 1950 parts n-heptanoic acid with sufficient xylene to maintain a constant reflux of the reaction mixture at 220° C. The reaction is continued until no more water is collected in the trap. Excess acid and xylene are then distilled out of the reaction mixture first at atmospheric pressure and then under vacuum down to 1 Torr with final stripping temperature reaching 220° C. After cooling to 150° C., 2% of HyfloSuper-Cel (Johns-Mansville Corp.), a filtering aid, is added, and the product is agitated for 1 hour and filtered while at all times keeping it blanketed with $N_2$ until it reaches room temperature.

The samples are processed on a 3"×8" two roll differential speed mill for 8 minutes at 165° C.–170° C. after the samples are banded and fluxed. The samples are sheeted off the mill at approximately 0.10" in thickness. For physical property measurements 6"×6"×0.075" sheets are compression molded and tensile test specimens are die cut. For heat-aging, 6"×6"×0.025" sheets are compression molded and tensile test specimens are die cut. Physical property testing is described in ASTM D 412. Compatibility testing by the Argus loop test is taken from ASTM D 329. The oven for heat aging is described in ASTM D 2436 and the retention of elongation and plasticizer loss tests are performed as described in UL 62 (12th ed, Sept. 21, 1981). The carbon volatility test is performed according to ASTM D-1203-55, at 70° C. for 24 hours in activated carbon.

Compatibility of the compositions with PVC is measured by the Milling Characteristic (good or bad) of the sample on a 2-roll mill (to be "good" it should flux out readily and form a sheet), by the exudation in the Argus loop test (none to slight) and by weight loss in the carbon volatility test (less than 0.4% being acceptable). The compatibility results are shown in Table 1.

TABLE 1

| | Compatibility Tests | | |
|---|---|---|---|
| Sample | Milling Characteristic | Argus Loop Exudation | Carbon Volatility % |
| Control 1 | good | none | .26 |
| Control 2 | good | none | .42 |
| Control 3 | good | slight | .50 |
| Example 1 | good | slight | .33 |
| Example 2 | good | none | .34 |

The loss of the composition by the sample after heat aging at 136° C. for 168 hours reflects on the plasticizer permanence; in general the loss from this formulation should be 5% or less to yield acceptable properties in high preformance wire and cable coverings. The results are shown in Table 2.

TABLE 2

| Plasticizer Loss After 7 Days at 136° C. | |
|---|---|
| Sample | Plasticizer Loss, % |
| Control 1 | 3.3 |
| Control 2 | 25.0 |
| Control 3 | 14.2 |
| Example 1 | 3.8 |
| Example 2 | 3.7 |

Data from Tables 1 and 2 show that: (a) the plasticizing composition of this invention is compatible with PVC and remains compatible up to a 1/1 extension (Table 1, Examples 1 and 2); and (b) comparison of Examples 1 and 2 with control 1 in Table 2 shows that plasticizer loss after aging is practically the same for the plasticizer and the extended plasticizer, indicating that the plasticizing composition of this invention is as permanent as tri(2-ethylhexyl)-trimellitate. Di-isodecylphthalate (DIPD), a high molecular weight plasticizer used to improve permanence in PVC, is only marginally compatible with PVC in this formulation (Table 1, control 2), and this compatibility is made unacceptable by extension with the heptanoate (Table 1, control 3). The very high loss of DIDP after aging (Table 2, control 2) is aided by extension (Table 2, control 3), but not enough to make it acceptable.

The plasticizing efficiency of the composition is assessed by measuring its physical properties. The physical properties of Control 1 and Examples 1 and 2 are measured and shown in Table 3. The properties are essentially identical (i.e., within test reproducibility limits) indicating that the plasticizing compositions of this invention are as efficient as tri(2-ethylhexyl)trimellitate (TOTM).

TABLE 3

| Physical Properties of Plasticized PVC | | | | |
|---|---|---|---|---|
| Sample | Modulus psi | Tensile Strength psi | Maximum Elongation % | Hardness Shore $A_2$ |
| Control 1 | 2050 | 2846 | 360 | 88 |
| Example 1 | 1920 | 2780 | 340 | 89 |
| Example 2 | 1990 | 2890 | 350 | 89 |

Retention of elongation after heat aging (7 days at 136° C.) is a key property for PVC wire and cable covering. A retention of greater than 65% is required for the UL specified 105° wire. TOTM and the plasticizing compositions of this invention passed this test as shown in Table 4.

TABLE 4

| Retention of Elongation after Heat Aging of Plasticized PVC | |
|---|---|
| Plasticizer | Retention of Elongation % |
| Control 1 | 94 |
| Example 1 | 97 |
| Example 2 | 102 |

What is claimed is:

1. A composition comprising:
   (a) polyvinylchloride;
   (b) at least one trimellitate ester having the structural formula

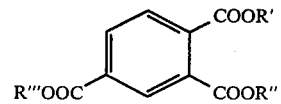

wherein R', R", and R''' are independently branched or straight chain alkyls having about 6 to about 10 carbon atoms; and
   (c) at least one pentaerythritol alkanoic acid ester, wherein the alkanoic acid is n-heptanoic acid or a mixture of straight chain $C_5$–$C_{10}$ monocarboxylic alkanoic acids having an average carbon chain length of 6.5 to 7.5 and having less than about 15% by weight $C_5$ and $C_{10}$ monocarboxylic alkanoic acids.

2. The material of claim 1, wherein the trimellitate ester is tri(2-ethylhexyl)phthalate.

3. The materal of claim 1, wherein the alkanoic acid is n-heptanoic acid.

4. A method for blending polyvinylchloride with at least one pentaerythritol alkanoic acid ester, wherein the alkanoic acid is n-heptanoic acid or a mixture of straight chain $C_5$–$C_{10}$ monocarboxylic alkanoic acids having an average carbon chain length of 6.5 to 7.5 and having less than about 15% by weight $C_5$ and $C_{10}$ monocarboxylic alkanoic acids comprising blending polyvinylchloride and the alkanoic acid ester in the presence of at least one trimellitate ester having the structural formula

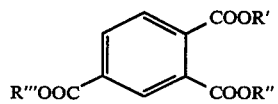

wherein R', R", and R''' are independently branched or straight chain alkyls having about 6 to about 10 carbon atoms.

5. In a wire or cable containing polyvinylchloride blended with a plasticizing composition as a jacket or insulator, the improvement wherein the plasticizing composition comprises:
   (a) at least one trimellitate ester having the structural formula

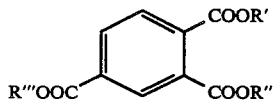

wherein R', R", and R''' are independently branched or straight chain alkyls having about 6 to about 10 carbon atoms; and
   (b) at least one pentaerythritol alkanoic acid ester, wherein the alkanoic acid is n-heptanoic acid or a mixture of straight chain $C_5$–$C_{10}$ monocarboxylic alkanoic acids having an average carbon chain length of 6.5 to 7.5 and having less than about 15% by weight $C_5$ and $C_{10}$ monocarboxylic alkanoic acids.

* * * * *

UNITED STATES PATENT AND TRADEMARK OFFICE
CERTIFICATE OF CORRECTION

PATENT NO. : 4,605,694
DATED : August 12, 1986
INVENTOR(S) : John F. Walker

It is certified that error appears in the above-identified patent and that said Letters Patent are hereby corrected as shown below:

Column 6 - Line 18  " tri(2-ethylhexyl)phthalate. "

Should read  -- tri (2-ethylhexyl)trimellitate. --

Signed and Sealed this

Thirteenth Day of January, 1987

Attest:

DONALD J. QUIGG

Attesting Officer

Commissioner of Patents and Trademarks